United States Patent
Lin (10) Patent No.: US 9,444,327 B2
(45) Date of Patent: Sep. 13, 2016

(54) BOOST PFC CONVERTER, METHOD AND CONTROL CIRCUIT USED FOR BOOST PFC CONVERTER

(71) Applicant: Chengdu Monolithic Power Systems Co., Ltd., Chengdu (CN)

(72) Inventor: Sicong Lin, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/575,835

(22) Filed: Dec. 18, 2014

(65) Prior Publication Data

US 2015/0180331 A1 Jun. 25, 2015

(30) Foreign Application Priority Data

Dec. 20, 2013 (CN) .......................... 2013 1 0714270

(51) Int. Cl.
*H02M 1/42* (2007.01)
*H02M 1/00* (2006.01)

(52) U.S. Cl.
CPC ......... *H02M 1/4241* (2013.01); *H02M 1/4225* (2013.01); *H02M 2001/0054* (2013.01); *Y02B 70/126* (2013.01)

(58) Field of Classification Search
CPC ............ Y02B 70/126; H02M 1/4208; H02M 1/4225; H02M 3/156; H02M 3/1588; H02M 7/217
USPC ...... 363/78, 84, 89; 323/207, 222, 275, 284, 323/285
See application file for complete search history.

(56) References Cited

U.S. PATENT DOCUMENTS

| | | | | |
|---|---|---|---|---|
| 4,449,079 A | * | 5/1984 | Erdman | H02P 6/085 318/400.31 |
| 6,272,025 B1 | * | 8/2001 | Riggio | H01F 3/10 363/133 |
| 7,317,625 B2 | * | 1/2008 | Zhang | H02M 1/4225 323/207 |
| 8,098,505 B1 | * | 1/2012 | Choi | H02M 1/4225 323/272 |
| 8,467,209 B2 | * | 6/2013 | Adragna | H02M 1/4225 323/222 |
| 2006/0044854 A1 | * | 3/2006 | Bocchiola | H02M 1/4208 363/86 |
| 2010/0134080 A1 | | 6/2010 | Ouyang | |
| 2012/0026765 A1 | * | 2/2012 | Adragna | H02M 1/4225 363/78 |
| 2012/0133285 A1 | * | 5/2012 | Kelly | H02M 1/4225 315/121 |
| 2012/0201063 A1 | * | 8/2012 | Sugawara | H02M 1/4225 363/89 |
| 2012/0313646 A1 | * | 12/2012 | Nishikawa | H02M 1/4225 324/415 |
| 2013/0148396 A1 | * | 6/2013 | Walters | H02M 1/4225 363/126 |
| 2014/0003105 A1 | | 1/2014 | Lin et al. | |
| 2014/0285163 A1 | | 9/2014 | Lin et al. | |
| 2016/0087528 A1 | | 3/2016 | Fogg et al. | |

* cited by examiner

*Primary Examiner* — Adolf Berhane (57) ABSTRACT

A boost PFC converter, a method and a control circuit used for boost PFC converter are discussed in the present invention. The boost PFC converter decreases the switching frequency when a line voltage is around zero, so that the whole operating efficiency is not decreased.

18 Claims, 6 Drawing Sheets

BOOST PFC CONVERTER, METHOD AND CONTROL CIRCUIT USED FOR BOOST PFC CONVERTER

CROSS-REFERENCE TO RELATED APPLICATION(S)

This application claims priority to and the benefit of Chinese Patent Application No. 201310714270.4, filed Dec. 20, 2013, which is incorporated herein by reference in its entirety.

TECHNICAL FIELD

The present invention relates to switching circuits, more specifically, the present invention relates to boost Power Factor Correction (PFC) converters.

BACKGROUND

Figure 1:
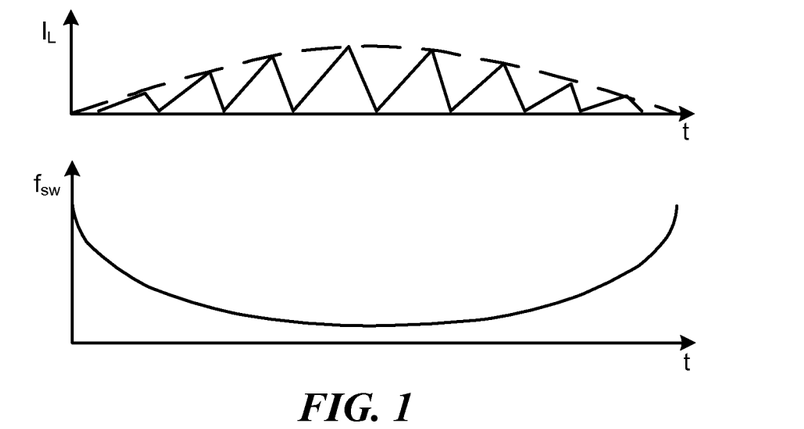
FIG. 1 schematically shows timing diagrams of inductor current and switching frequency of prior boost PFC converter.

Boost PFC converters usually adopt constant on time control mode. Under this control mode, the switch is turned on every time when the inductor current crosses zero and is kept on for a fixed time in each switching cycle. That is, the boost PFC converter works at critical mode to reduce switching loss. However, the boost PFC converter has a very high peak switching frequency when the input line voltage crosses zero under this control mode, as shown in FIG. 1. Especially under high line input voltage and light load condition, the efficiency worsens as the switching frequency goes higher.

SUMMARY

It is an object of the present invention to provide an improved boost PFC converter, which solves the above problems.

A boost PFC converter, a method and a control circuit used for boost PFC converter are discussed. The boost PFC converter includes a control circuit having a peak holding circuit, a saw-tooth wave generator, a first comparator, a logical unit, a logical NOR circuit, a voltage converting unit, a voltage-current converter, a first charge capacitor, a charge switch, an error amplifier, a second comparator, and a logical circuit. The control circuit decreases the switching frequency when a line voltage is around zero, so as to insure the whole operating efficiency of the boost PFC converter to be high.

BRIEF DESCRIPTION OF THE DRAWINGS

The use of the similar reference label in different drawings indicates the same of like components.

DETAILED DESCRIPTION

Embodiments of circuits for boost PFC converter, a method and a control circuit used for boost PFC converter are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 2:
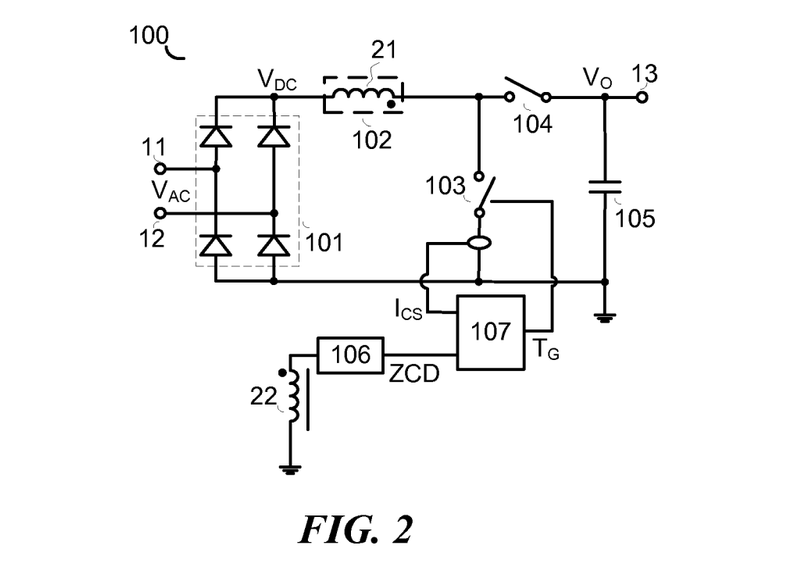
FIG. 2 schematically shows a boost PFC converter 100 in accordance with an embodiment of the present invention.

FIG. 2 schematically shows a boost PFC converter 100 in accordance with an embodiment of the present invention. In the example of FIG. 1, the boost PFC converter 100 comprises: a first input port 11 and a second input port 12, configured to receive an AC input signal $V_{AC}$; an output port 13, configured to provide an output signal $V_O$; a rectifier 101, coupled to the first input port 11 and the second input port 12 to receive the AC input signal $V_{AC}$ and to generate a rectified signal $V_{DC}$; an energy storage component 102, having a first terminal and a second terminal, the first terminal being configured to receive the rectified signal $V_{DC}$; a first power switch 103, coupled between the second terminal of the energy storage component 102 and a reference ground, the first power switch 103 having a control terminal configured to receive a switch control signal Tg; a second power switch 104, coupled between the second terminal of the energy storage component 102 and the output port 13; an output capacitor 105, coupled between the output port 13 and the reference ground; a zero crossing detector 106, configured to generate a zero crossing detecting signal ZCD indicative of a zero crossing condition of a current flowing through the energy storage component 102; a control circuit 107, configured to receive the zero crossing detecting signal ZCD and a current sense signal $I_{CS}$ indicative of a current flowing through the energy storage component 102, to generate the switch control signal Tg.

In one embodiment, the second power switch 104 comprises a power diode.

In one embodiment, the current sense signal $I_{CS}$ is generated by sensing a current flowing through the first power switch 103, e.g., by sensing a voltage across a current sense resistor (not shown) coupled in series with the first power switch 103.

In one embodiment, the energy storage component 102 comprises a primary side winding 21 of a transformer. In one embodiment, the boost PFC converter 100 further comprises: an auxiliary winding 22, coupled between the zero crossing detector 106 and the reference ground, to detect the zero crossing condition of the current flowing through the energy storage component 102. When the first power switch 103 is turned on, the current flowing through the storage component 102 increases, the voltage across the auxiliary winding 22 is negative, and the zero crossing detecting signal ZCD is logical low; when the first power switch 103 is turned off, and the second power switch 104 is freewheeling, the voltage across the auxiliary winding 22 is positive, and the zero crossing detecting signal ZCD is logical high.

In one embodiment, the current sense signal $I_{CS}$ may be a voltage signal, e.g., it is a voltage across a current sense resistor. In other embodiments, the current sense signal $I_{CS}$ may be a current signal.

Figure 3:
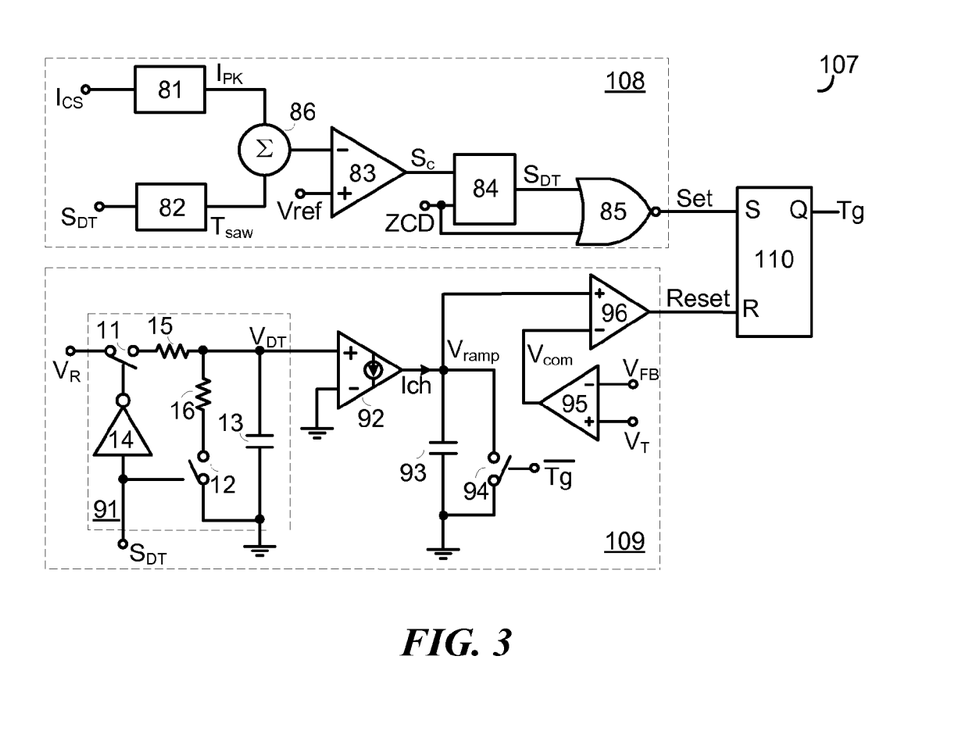
FIG. 3 schematically shows a circuit configuration of the control circuit 107 in FIG. 2 in accordance with an embodiment of the present invention.

FIG. 3 schematically shows a circuit configuration of the control circuit 107 in FIG. 2 in accordance with an embodiment of the present invention. In the example of FIG. 3, the control circuit 107 comprises: a set signal generator 108, configured to generate a set signal Set; a reset signal generator 109, configured to generate a reset signal Reset; a logical circuit 110, having a set input terminal S coupled to the set signal generator 108 to receive the set signal Set, a reset input terminal R coupled to the reset signal generator 109 to receive the reset signal Rest, and an output terminal Q configured to generate the switch control signal Tg based on the set signal Set and the reset signal Reset.

Specifically speaking, in the example of FIG. 3, the set signal generator 108 comprises: a peak holding circuit 81, configured to receive the current sense signal $I_{CS}$ indicative of the current flowing through the energy storage component 102, and to generate a peak holding signal $I_{PK}$ indicative of the peak current flowing through the energy storage component 102; a saw-tooth wave generator 82, configured to generate a saw-tooth wave signal $T_{saw}$; a first comparator 83, configured to receive the peak holding signal $I_{PK}$, the saw-tooth wave signal $T_{saw}$, and a reference voltage Vref, to generate a comparison signal Sc by comparing the sum of the peak holding signal $I_{PK}$ and the saw-tooth wave signal $T_{saw}$ with the reference voltage Vref; a logical unit 84, having a first input terminal coupled to the first comparator 83 to receive the comparison signal Sc, a second input terminal configured to receive the zero crossing detecting signal ZCD, and an output terminal configured to generate a dead time signal $S_{DT}$; a logical NOR circuit 85, having a first input terminal coupled to the output terminal of the logical unit 84 to receive the dead time signal $S_{DT}$, a second input terminal configured to receive the zero crossing detecting signal ZCD, and an output terminal configured to generate the set signal Set.

In the example of FIG. 3, the reset signal generator 109 comprises: a voltage converting unit 91, configured to receive a fixed voltage $V_R$ and the dead time signal $S_{DT}$, to generate a converting voltage $V_{DT}$; a voltage-current converter 92, coupled to the voltage converting unit 91 to receive the converting voltage $V_{DT}$, and to generate a current signal Ich proportional to the converting voltage $V_{DT}$ (Ich=$V_{DT} \times K_I$, wherein $K_I$ is a converting coefficient); a first charge capacitor 93 and a charge switch 94, parallel coupled between the voltage-current converter 92 and the reference ground, wherein the charge switch 94 has an opposite switching status to the first power switch 103 (i.e., the charge switch 94 is controlled by the inverted switch control signal Tg), and wherein the first charge capacitor 93 is shorted when the charge switch 94 is on, and is charged by the current signal Ich when the charge switch 94 is off; an error amplifier 95, having a first input terminal configured to receive a feedback signal $V_{FB}$ indicative of the output signal $V_O$, a second input terminal configured to receive a voltage reference signal $V_T$, and an output terminal configured to generate a compensation signal $V_{com}$ by amplifying and integrating the difference between the feedback signal $V_{FB}$ and the voltage reference signal $V_T$; a second comparator 96, having a first input terminal configured to receive a voltage $V_{ramp}$ across the first charge capacitor 93, a second input terminal coupled to the output terminal of the error amplifier 95 to receive the compensation signal $V_{com}$, and an output terminal configured to generate the reset signal Reset by comparing the voltage $V_{ramp}$ across the first charge capacitor 93 with the compensation signal $V_{com}$; wherein at the voltage converting unit 91, the converting voltage $V_{DT}$, the fixed voltage $V_R$, and the dead time signal $S_{DT}$ have a following relationship:

$$V_{DT} = V_R \times \frac{(T - t_H)}{T} \tag{1}$$

wherein T represents the cycle of the dead time signal (i.e., the switching cycle), $t_H$ represents the time period of the dead time signal $S_{DT}$.

In one embodiment, the fixed voltage $V_R$ at high line voltage condition has a voltage level three times of that at low line voltage condition.

In one embodiment, the set signal generator 108 further comprises an operation unit 86, configured to receive the peak holding signal $I_{PK}$ and the saw-tooth wave signal $T_{saw}$, to execute add operation on the peak holding signal $I_{PK}$ and the saw-tooth wave signal $T_{saw}$, and to provide the operation result to the first comparator 83.

In one embodiment, the saw-tooth wave generator 82 generates the saw-tooth wave signal $T_{saw}$ based on the dead time signal $S_{DT}$: when the dead time signal $S_{DT}$ turns to logical high from logical low, the saw-tooth wave signal $T_{saw}$ starts to increase; when the dead time signal $S_{DT}$ turns to logical low from logical high, the saw-tooth wave signal $T_{saw}$ falls quickly. That is, the saw-tooth wave signal $T_{saw}$ starts to increase in response to a rising edge of the dead time signal $S_{DT}$, and falls quickly in response to a falling edge of the dead time signal $S_{DT}$.

In one embodiment, the dead time signal $S_{DT}$ turns to logical high when the zero crossing detecting signal ZCD turns logical low from logical high; and the dead time signal $S_{DT}$ turns to logical low when the comparison signal Sc turns logical low from logical high. That is, the dead time signal $S_{DT}$ turns to logical high in response to a falling edge of the zero crossing detecting signal ZCD, and turns to logical low in response to a falling edge of the comparison signal Sc.

In one embodiment, the voltage converting unit 91 comprises: a first switch 11, having a first end, a second end and a control end, wherein the first end is configured to receive the fixed voltage $V_R$, the second end is coupled to the voltage-current converter 92, and the control end is configured to receive the dead time signal $S_{DT}$; a second switch 12, having a first end, a second end and a control end, wherein the first end is coupled to a reference ground, the second end is coupled to the voltage-current converter 92, and the control end is configured to receive the dead time signal $S_{DT}$; a storage capacitor 13, coupled between the voltage-current converter 92 and the reference ground; wherein the first switch 11 and second switch 12 is turned on complementary.

In one embodiment, the first switch 11 is turned on when the dead time signal $S_{DT}$ is logical low, and the second switch 12 is turned on when the dead time signal $S_{DT}$ is logical high. In one embodiment, the dead time signal $S_{DT}$ is coupled to the control end of the first switch 11 via an inverter 14.

In one embodiment, the voltage converting converter 91 further comprises: a first resistor 15, coupled in series with the first switch 11; a second resistor 16, coupled in series with the second switch 12.

Figure 4:
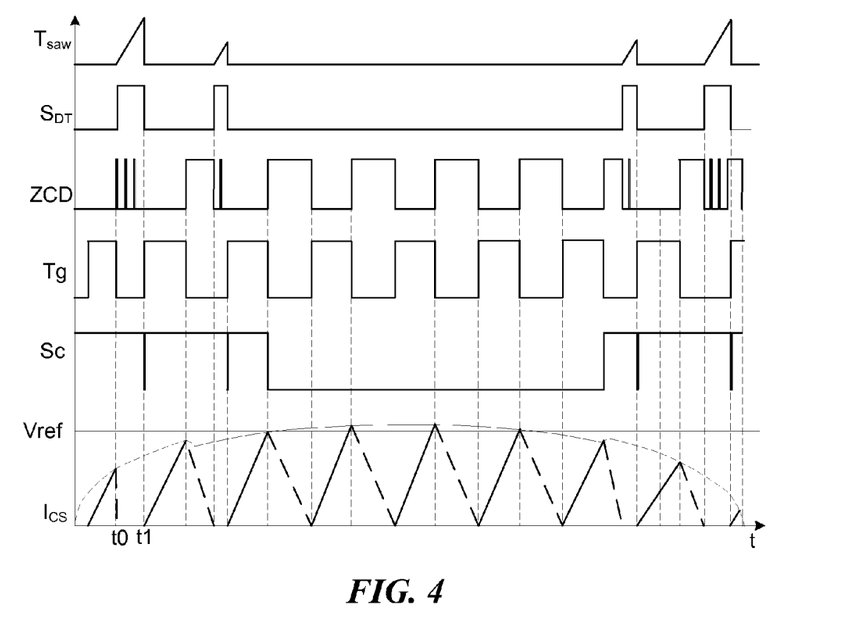
FIG. 4 schematically shows the timing waveforms of the saw-tooth signal $T_{saw}$, the dead time signal $S_{DT}$, the zero crossing detecting signal ZCD, the switch control signal Tg, the comparison signal $S_C$, the reference voltage Vref, and the current sense signal $I_{CS}$ in the control circuit 107 in FIG. 3.
Figure 5:
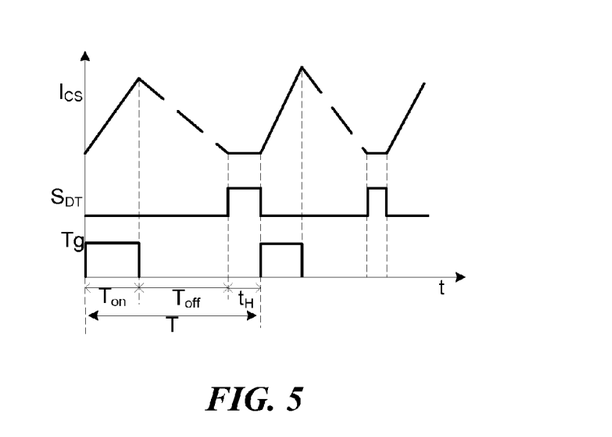
FIG. 5 schematically shows the timing waveforms of the current sense signal $I_{CS}$, the dead time signal $S_{DT}$ and the switch control signal Tg in different time intervals in the control circuit 107 in FIG. 3.

The operation of the boost PFC converter 100 will be illustrated in combination with FIG. 4 and FIG. 5 as the following text.

During the operation of the boost PFC converter 100, when the current flowing through the energy storage 102 is relatively high, the current sense signal $I_{CS}$ is high, so the peak holding signal $I_{PK}$ provided by the peak holding circuit 81 is also high. Accordingly, the comparison signal Sc provided by the first comparator 83 keeps logical low. So the dead time signal $S_{DT}$ and the set signal Set are determined by the zero crossing detecting signal ZCD, and the boost PFC converter 100 operates in continuous current mode (CCM).

When the AC input signal $V_{AC}$ (i.e., the line input voltage) is around zero, the current flowing through the energy storage component 102 is relatively low. That is, the current sense signal $I_{CS}$ is relatively low, so the peak holding signal $I_{PK}$ provided by the peak holding circuit 81 is also low. If the peak holding signal $I_{PK}$ is lower than the reference voltage Vref, the comparison signal Sc is logical high. In a switching cycle, the dead time signal $S_{DT}$ responds to the comparison signal Sc and the zero crossing detecting signal ZCD. At time point t0, the switch control signal Tg turns to logical low from logical high, so the first power switch 103 is turned off, and the second power switch 104 is freewheeling. Accordingly, the zero crossing detecting signal ZCD turns to logical high from logical low. Because the peak current of the current flowing through the energy storage component 102 is low at this time, the current falls to zero in short time period. So the zero crossing detecting signal ZCD turns to logical low after this short time period. The dead time signal $S_{DT}$ turns to logical high in response to this falling edge of the zero crossing detecting signal ZCD. Accordingly, the saw-tooth signal $T_{saw}$ starts to increase. When the sum of the saw-tooth signal $T_{saw}$ and the peak holding signal $I_{PK}$ is higher than the reference voltage Vref at time point t1, the comparison signal Sc turns to logical low. Then the dead time signal $S_{DT}$ turns to logical low in response to the falling edge of the comparison signal Sc. In one hand, the falling edge of the dead time signal $S_{DT}$ causes the saw-tooth signal $T_{saw}$ falls quickly. In the other hand, the set signal Set provided by the logical NOR circuit 85 turns to logical high due to its two input signals (the dead time signal $S_{DT}$ and the zero crossing detecting signal ZCD) are both logical low. As a result, the logical circuit 110 is set, and the switch control signal Tg turns to logical high, which turns on the first power switch 103. Then the current flowing through the energy storage component 102 increases from zero, and the boost PFC converter 100 enters a new switching cycle.

As seen from FIG. 4, when the peak current flowing through the energy storage component 102 is relatively low (e.g., when the line voltage crosses zero), the boost PFC converter 100 enters discontinuous current mode (DCM): when the dead time signal $S_{DT}$ is logical high, the current flowing through the energy storage component 102 is zero; and neither of the first power switch 103 and the second power switch 104 flows current.

In a switching cycle, the switching cycle is T, the dead time is $t_H$ ($t_H=0$ at CCM). Assuming the ON time of the first power switch 103 is $T_{on}$, the freewheeling time of the second power switch 104 is $T_{off}$, from the timing waveforms of the current sense signal $I_{CS}$, the dead time signal $S_{DC}$ and the switch control signal Tg as shown in FIG. 5, we can get $$T_{on}+T_{off}=T-T_H \quad (2)$$

The average input current $I_{in}$ and the AC input voltage $V_{AC}$ in a switching cycle has a following relationship $$I_{in} = V_{AC} \times \frac{(T_{on} \times (T_{on} + T_{off}))}{2 \times T \times L} \quad (3)$$

wherein L is the inductance of the energy storage component 102.

At the reset signal generator 109, the voltage $V_{ramp}$ across the first charge capacitor 93 and the converting voltage $V_{DT}$ has a following relationship:

$$V_{ramp} = \frac{V_{DT} \times K_I \times T_{on}}{C_{93}} \quad (4)$$

wherein $C_{93}$ represents the capacitance of the first charge capacitor 93.

According to "virtual short" law of a comparator, the voltage $V_{ramp}$ across the first charge capacitor 93 is equal to the compensation signal $V_{com}$, i.e., $$V_{ramp}=V_{com} \quad (5)$$

Combine formulas (1)-(5), we can get:

$$\frac{V_{AC}}{I_{in}} = \frac{2 \times V_R \times K_I \times L}{C_{93} \times V_{com}}$$

In a switching cycle, the voltage level of the fixed voltage $V_R$, the voltage level of the compensation signal $V_{com}$, the inductance L of the energy storage component 102, the capacitance $C_{93}$ of the first charge capacitor 93 are substantially constant, so the ratio of the AC input voltage $V_{AC}$ and the average input current $I_{in}$ is substantially constant. So the boost PFC converter 100 realizes power factor correction.

Figure 6:
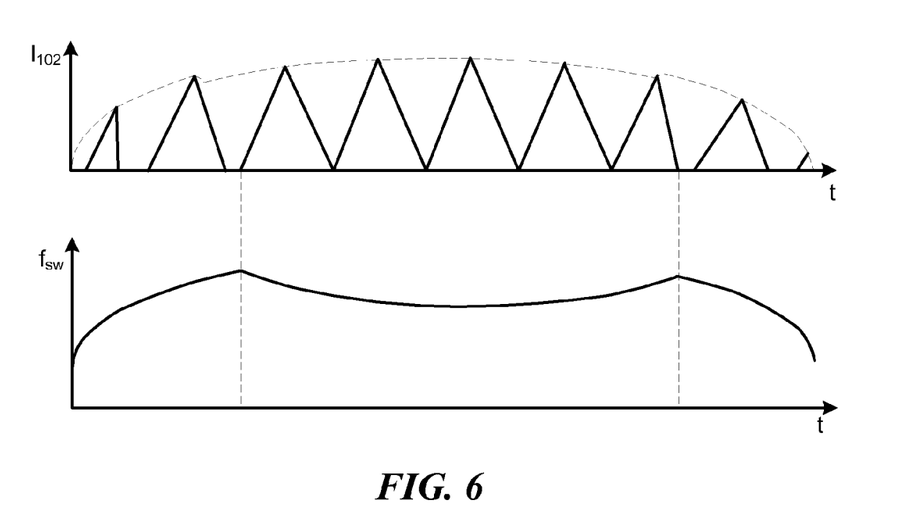
FIG. 6 schematically shows timing waveforms of the switching frequency $f_{sw}$ and the current $I_{102}$ flowing through the energy storage component 102.

Because the average input current is relatively low when the line voltage of the boost PFC converter 100 is around zero, the boost PFC converter 100 operates at DCM at this time. In addition, because of the existence of the dead time, the switching frequency $f_{sw}$ of the boost PFC converter 100 when the line voltage around zero is relatively low. As a result, the operation efficiency of the boost PFC converter would not decrease. FIG. 6 schematically shows timing waveforms of the switching frequency $f_{sw}$ and the current $I_{102}$ flowing through the energy storage component 102.

Figure 7:
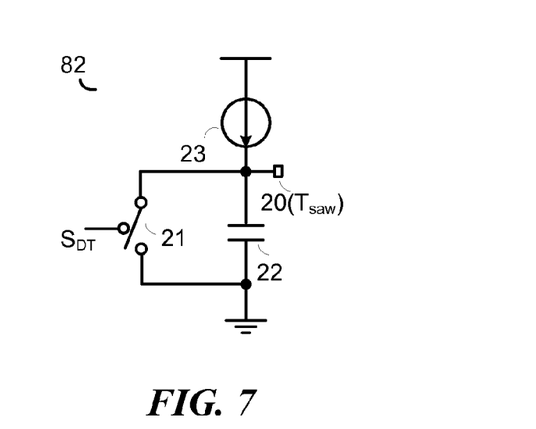
FIG. 7 schematically shows a circuit configuration of the saw-tooth wave generator 82 in accordance with an embodiment of the present invention.

FIG. 7 schematically shows a circuit configuration of the saw-tooth wave generator 82 in accordance with an embodiment of the present invention. In the example of FIG. 7, the saw-tooth wave generator 82 comprises: a saw-tooth wave port 20, configured to provide the saw-tooth wave signal $T_{saw}$; a reset switch 21, a second charge capacitor 22, parallel coupled between the saw-tooth wave port 20 and the reference ground; a charge current source 23, coupled between a power supply and the saw-tooth wave port 20;

wherein the reset switch 21 is turned on when the dead time signal $S_{DT}$ is logical low, and is turned off when the dead time signal $S_{DT}$ is logical high.

Figure 8:
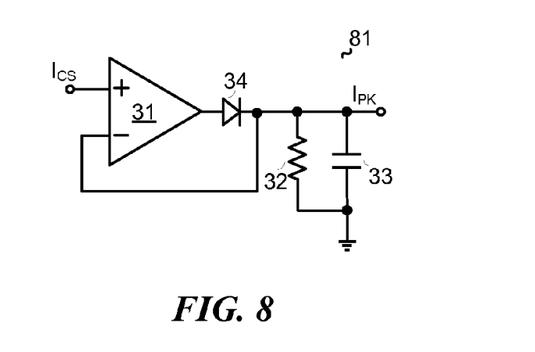
FIG. 8 schematically shows a circuit configuration of the peak holding circuit 81 in accordance with an embodiment of the present invention.

FIG. 8 schematically shows a circuit configuration of the peak holding circuit 81 in accordance with an embodiment of the present invention. In the example of FIG. 8, the peak holding circuit 81 comprises: an operational amplifier 31, having a first input terminal, a second input terminal and an output terminal, wherein the first input terminal is configured to receive the current sense signal $I_{CS}$; a diode 34, having an anode and a cathode, wherein the anode is coupled to the output terminal of the operational amplifier 31, the cathode is coupled to the second input terminal of the operational amplifier 31; a sample hold resistor 32, coupled between the cathode of the diode 34 and the reference ground; a sample hold capacitor 33, coupled between the cathode of the diode 34 and the reference ground; wherein a voltage across the sample hold capacitor 33 is the peak holding signal $I_{PK}$.

Figure 9:
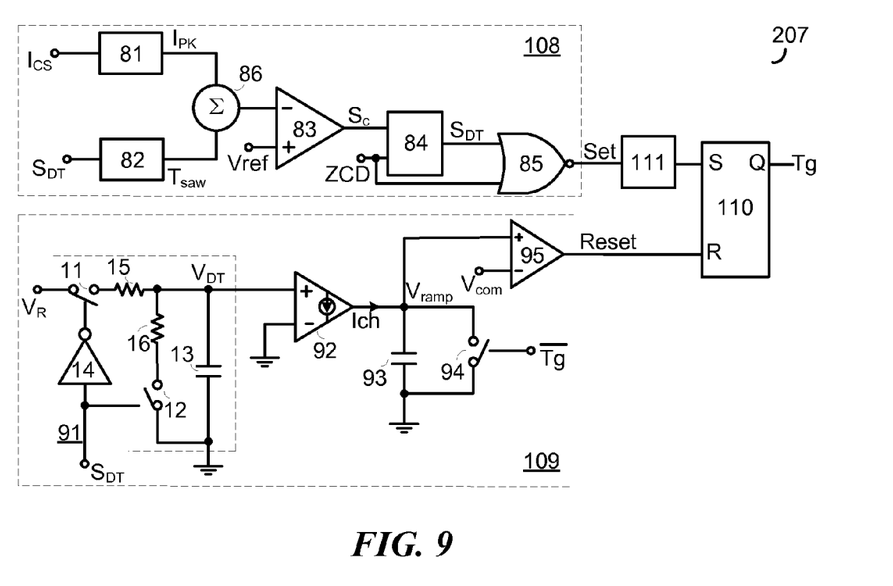
FIG. 9 schematically shows a circuit configuration of the control circuit 207 in accordance with an embodiment of the present invention.

FIG. 9 schematically shows a circuit configuration of the control circuit 207 in accordance with an embodiment of the present invention. The control circuit 207 in FIG. 9 is similar to the control circuit 107 in FIG. 3, with a difference that the control circuit 207 in FIG. 9 further comprises: a short pulse circuit 111, coupled between the output terminal of the logical NOR circuit 85 and the set input terminal S of the logical circuit 110. In the example of FIG. 9, the short pulse circuit 111 is configured to receive the set signal Set, to generate a short pulse signal to the set input terminal S of the logical circuit 110. In one embodiment, the short pulse signal has a logical high level lasting for around 100 ns.

The operation principle of the control circuit 207 in FIG. 9 is similar to that of the control circuit 107 in FIG. 3.

Figure 10:
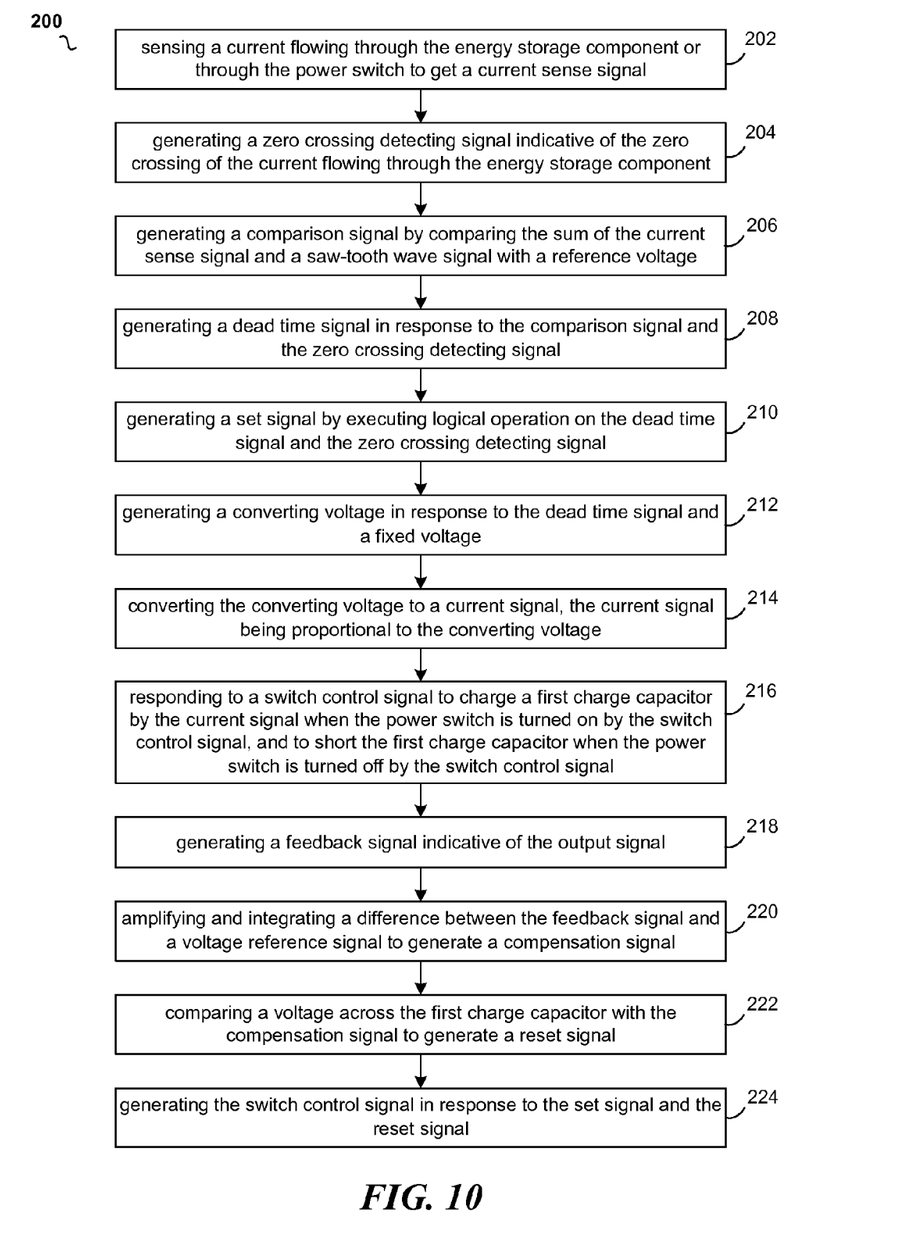
FIG. 10 schematic shows a flowchart 200 of a method used in a boost PFC converter in accordance with an embodiment of the present invention.

Furthermore, the present invention provides a method used in a boost PFC converter, as shown in FIG. 10, which schematic shows a flowchart 200 in accordance with an embodiment of the present invention. The boost PFC converter is configured to receive an AC input signal to provide an output signal, and the boost PFC converter comprises an energy storage component and a power switch, the method comprises:

Step 202, sensing a current flowing through the energy storage component or through the power switch to get a current sense signal.

Step 204, generating a zero crossing detecting signal indicative of the zero crossing of the current flowing through the energy storage component.

Step 206, generating a comparison signal by comparing the sum of the current sense signal and a saw-tooth wave signal with a reference voltage.

Step 208, generating a dead time signal in response to the comparison signal and the zero crossing detecting signal.

Step 210, generating a set signal by executing logical operation on the dead time signal and the zero crossing detecting signal. In one embodiment, the logical operation comprises logical NOR operation.

Step 212, generating a converting voltage in response to the dead time signal and a fixed voltage; wherein the converting voltage, the dead time signal and the fixed voltage has a following relationship:

$$V_{DT} = V_R \times \frac{(T - t_H)}{T}$$

wherein $V_{DT}$ represents the voltage level of the converting voltage, $V_R$ represents the voltage level of the fixed voltage, T represents the cycle of the dead time signal, and $t_H$ represents the duration of the dead time signal in a switching cycle.

Step 214, converting the converting voltage to a current signal, the current signal being proportional to the converting voltage.

Step 216, responding to a switch control signal to charge a first charge capacitor by the current signal when the power switch is turned on by the switch control signal, and to short the first charge capacitor when the power switch is turned off by the switch control signal.

Step 218, generating a feedback signal indicative of the output signal.

Step 220, amplifying and integrating a difference between the feedback signal and a voltage reference signal to generate a compensation signal.

Step 222, comparing a voltage across the first charge capacitor with the compensation signal to generate a reset signal.

Step 224, generating the switch control signal in response to the set signal and the reset signal.

In one embodiment, the saw-tooth wave signal changes in response to the dead time signal: the saw-tooth wave signal starts to increase when the dead time signal turns to logical high from logical low; and the saw-tooth wave signal decreases quickly when the dead time signal turns to logical low from logical high.

In one embodiment, in step 208, generating a dead time signal in response to the comparison signal and the zero crossing detecting signal comprises: the dead time signal turns to logical high in response to a falling edge of the zero crossing detecting signal, and turns to logical low in response to a falling edge of the comparison signal.

Several embodiments of the foregoing boost PFC converter and the method thereof realize power factor correction and decrease the switching frequency when the line voltage crosses zero, so as to insure the whole operating efficiency of the boost PFC converter.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

I claim:

1. A control circuit used in a boost PFC converter, the boost PFC converter is configured to receive an input signal to provide an output signal, the boost PFC converter includes a rectifier, an energy storage component, a first power switch, a second power switch and a zero crossing detector generating a zero crossing detecting signal indicative of a zero crossing condition of a current flowing through the energy storage component, the control circuit comprising:

a peak holding circuit, configured to receive a current sense signal indicative of the current flowing through the energy storage component, and to generate a peak holding signal indicative of the peak current flowing through the energy storage component;

a saw-tooth wave generator, configured to generate a saw-tooth wave signal;

a first comparator, configured to receive the peak holding signal, the saw-tooth wave signal, and a reference voltage, to generate a comparison signal by comparing the sum of the peak holding signal and the saw-tooth wave signal with the reference voltage;

a logical unit, having a first input terminal coupled to the first comparator to receive the comparison signal, a second input terminal configured to receive the zero crossing detecting signal, and an output terminal configured to generate a dead time signal;

a logical NOR circuit, having a first input terminal coupled to the output terminal of the logical unit to receive the dead time signal, a second input terminal configured to receive the zero crossing detecting signal, and an output terminal configured to generate the set signal;

a voltage converting unit, configured to receive a fixed voltage and the dead time signal, to generate a converting voltage;

a voltage-current converter, coupled to the voltage converting unit to receive the converting voltage, and to generate a current signal proportional to the converting voltage;

a first charge capacitor and a charge switch, parallel coupled between the voltage-current converter and the reference ground, wherein the charge switch 94 has an opposite switching status to the first power switch;

an error amplifier, having a first input terminal configured to receive a feedback signal indicative of the output signal, a second input terminal configured to receive a voltage reference signal, and an output terminal configured to generate a compensation signal by amplifying and integrating the difference between the feedback signal and the voltage reference signal;

a second comparator, having a first input terminal configured to receive a voltage across the first charge capacitor, a second input terminal coupled to the output terminal of the error amplifier to receive the compensation signal, and an output terminal configured to generate the reset signal by comparing the voltage across the first charge capacitor with the compensation signal; and a logical circuit, having a set input terminal coupled to the logical NOR circuit to receive the set signal, a reset input terminal coupled to the output terminal of the second comparator to receive the reset signal, and an output terminal configured to generate a switch control signal to control the first power switch.

2. The control circuit of claim 1, wherein the peak holding circuit comprises:

an operational amplifier, having a first input terminal, a second input terminal and an output terminal, wherein the first input terminal is configured to receive the current sense signal;

a diode, having an anode and a cathode, wherein the anode is coupled to the output terminal of the operational amplifier, the cathode is coupled to the second input terminal of the operational amplifier;

a sample hold resistor, coupled between the cathode of the diode and the reference ground;

a sample hold capacitor, coupled between the cathode of the diode and the reference ground; wherein a voltage across the sample hold capacitor is the peak holding signal.

3. The control circuit of claim 1, wherein the saw-tooth wave generator is configured to receive the dead time signal, to start to increase in response to a rising edge of the dead time signal and to fall quickly in response to a falling edge of the dead time signal.

4. The control circuit of claim 1, wherein at the voltage converting unit, the converting voltage, the dead time signal and the fixed voltage has a following relationship:

$$V_{DT} = V_R \times \frac{(T - t_H)}{T}$$

wherein VDT represents a voltage level of the converting voltage, VR represents a voltage level of the fixed voltage, T represents a switching cycle of the dead time signal, and tH represents the duration of the dead time signal in a switching cycle.

5. The control circuit of claim 1, wherein at the logical unit, the dead time signal turns to logical high in response to a falling edge of the zero crossing detecting signal, and turns to logical low in response to a falling edge of the comparison signal.

6. The control circuit of claim 1, further comprising: a short pulse circuit, coupled between the output terminal of the logical NOR circuit and the set input terminal of the logical circuit, wherein the he short pulse circuit is configured to receive the set signal, to generate a short pulse signal to the set input terminal S of the logical circuit.

7. The control circuit of claim 1, further comprising: an operation unit, configured to receive the peak holding signal and the saw-tooth wave signal, to execute add operation on the peak holding signal and the saw-tooth wave signal, and to provide the operation result to the first comparator.

8. A boost PFC converter, comprising:

a first input port and a second input port, configured to receive an AC input signal;

an output port, configured to provide an output signal;

a rectifier, coupled to the first input port and the second input port to receive the AC input signal and to generate a rectified signal;

an energy storage component having a first terminal and a second terminal, the first terminal being configured to receive the rectified signal;

a first power switch, coupled between the second terminal of the energy storage component and a reference ground, the first power switch having a control terminal configured to receive a switch control signal;

a second power switch, coupled between the second terminal of the energy storage component and the output port;

a zero crossing detector, configured to generate a zero crossing detecting signal indicative of a zero crossing condition of a current flowing through the energy storage component;

a peak holding circuit, configured to receive a current sense signal indicative of the current flowing through the energy storage component, and to generate a peak holding signal indicative of the peak current flowing through the energy storage component;

a saw-tooth wave generator, configured to generate a saw-tooth wave signal;

a first comparator, configured to receive the peak holding signal, the saw-tooth wave signal, and a reference voltage, to generate a comparison signal by comparing the sum of the peak holding signal and the saw-tooth wave signal with the reference voltage;

a logical unit, having a first input terminal coupled to the first comparator to receive the comparison signal, a second input terminal configured to receive the zero crossing detecting signal, and an output terminal configured to generate a dead time signal;

a logical NOR circuit, having a first input terminal coupled to the output terminal of the logical unit to receive the dead time signal, a second input terminal configured to receive the zero crossing detecting signal, and an output terminal configured to generate the set signal;

a voltage converting unit, configured to receive a fixed voltage and the dead time signal, to generate a converting voltage;

a voltage-current converter, coupled to the voltage converting unit to receive the converting voltage, and to generate a current signal proportional to the converting voltage;

a first charge capacitor and a charge switch, parallel coupled between the voltage-current converter and the reference ground, wherein the charge switch 94 has an opposite switching status to the first power switch;

an error amplifier, having a first input terminal configured to receive a feedback signal indicative of the output signal, a second input terminal configured to receive a voltage reference signal, and an output terminal configured to generate a compensation signal by amplifying and integrating the difference between the feedback signal and the voltage reference signal;

a second comparator, having a first input terminal configured to receive a voltage across the first charge capacitor, a second input terminal coupled to the output terminal of the error amplifier to receive the compensation signal, and an output terminal configured to generate the reset signal by comparing the voltage across the first charge capacitor with the compensation signal; and a logical circuit, having a set input terminal coupled to the logical NOR circuit to receive the set signal, a reset input terminal coupled to the output terminal of the second comparator to receive the reset signal, and an output terminal configured to generate the switch control signal to control the first power switch.

9. The boost PFC converter of claim 8, wherein the peak holding circuit comprises:

an operational amplifier, having a first input terminal, a second input terminal and an output terminal, wherein the first input terminal is configured to receive the current sense signal;

a diode, having an anode and a cathode, wherein the anode is coupled to the output terminal of the operational amplifier, the cathode is coupled to the second input terminal of the operational amplifier;

a sample hold resistor, coupled between the cathode of the diode and the reference ground;

a sample hold capacitor, coupled between the cathode of the diode and the reference ground; wherein a voltage across the sample hold capacitor is the peak holding signal.

10. The boost PFC converter of claim 8, wherein the saw-tooth wave generator is configured to receive the dead time signal, to start to increase in response to a rising edge of the dead time signal and to fall quickly in response to a falling edge of the dead time signal.

11. The boost PFC converter of claim 8, wherein at the voltage converting unit, the converting voltage, the dead time signal and the fixed voltage has a following relationship:

$$V_{DT} = V_R \times \frac{(T - t_H)}{T}$$

wherein VDT represents a voltage level of the converting voltage, VR represents a voltage level of the fixed voltage, T represents a switching cycle of the dead time signal, and tH represents the duration of the dead time signal in a switching cycle.

12. The boost PFC converter of claim 8, wherein at the logical unit, the dead time signal turns to logical high in response to a falling edge of the zero crossing detecting signal, and turns to logical low in response to a falling edge of the comparison signal.

13. The boost PFC converter of claim 8, further comprising: a short pulse circuit, coupled between the output terminal of the logical NOR circuit and the set input terminal of the logical circuit, wherein the he short pulse circuit is configured to receive the set signal, to generate a short pulse signal to the set input terminal S of the logical circuit.

14. The boost PFC converter of claim 8, further comprising: an operation unit, configured to receive the peak holding signal and the saw-tooth wave signal, to execute add operation on the peak holding signal and the saw-tooth wave signal, and to provide the operation result to the first comparator.

15. A method used in a boost PFC converter, the boost PFC converter is configured to receive an AC input signal to provide an output signal, and the boost PFC converter comprises an energy storage component and a power switch, the method comprising:

sensing a current flowing through the energy storage component or through the power switch to get a current sense signal;

generating a zero crossing detecting signal indicative of the zero crossing of the current flowing through the energy storage component;

generating a dead time signal in response to the comparison signal and the zero crossing detecting signal;

generating a set signal by executing logical operation on the dead time signal and the zero crossing detecting signal;

generating a converting voltage in response to the dead time signal and a fixed voltage;

converting the converting voltage to a current signal, the current signal being proportional to the converting voltage;

responding to a switch control signal to charge a first charge capacitor by the current signal when the power switch is turned on by the switch control signal, and to short the first charge capacitor when the power switch is turned off by the switch control signal;

generating a feedback signal indicative of the output signal;

amplifying and integrating a difference between the feedback signal and a voltage reference signal to generate a compensation signal;

comparing a voltage across the first charge capacitor with the compensation signal to generate a reset signal; and generating the switch control signal in response to the set signal and the reset signal; wherein
the converting voltage, the dead time signal and the fixed voltage has a following relationship;

$$V_{DT} = V_R \times \frac{(T - t_H)}{T}$$

wherein VDT represents the voltage level of the converting voltage, VR represents the voltage level of the fixed voltage, T represents the cycle of the dead time signal, and tH represents the duration of the dead time signal in a switching cycle.

16. The method of claim 15, wherein the logical operation comprises logical NOR operation.

17. The method of claim 15, wherein the saw-tooth wave signal changes in response to the dead time signal: the saw-tooth wave signal starts to increase when the dead time signal turns to logical high from logical low; and the saw-tooth wave signal decreases quickly when the dead time signal turns to logical low from logical high.

18. The method of claim 15, wherein the step "generating a dead time signal in response to the comparison signal and the zero crossing detecting signal" comprises: the dead time signal turns to logical high in response to a falling edge of the zero crossing detecting signal, and turns to logical low in response to a falling edge of the comparison signal.

* * * * *